(12) United States Patent
Wildermuth et al.

(10) Patent No.: US 9,670,805 B2
(45) Date of Patent: Jun. 6, 2017

(54) FILTERING SYSTEM FOR MOTOR OIL OF AN INTERNAL COMBUSTION ENGINE AND REPLACEABLE FILTER OF A FILTERING SYSTEM

(71) Applicant: MANN+HUMMEL GMBH, Ludwigsburg (DE)

(72) Inventors: Andreas Wildermuth, Marbach (DE); Sven Epli, Heilbronn (DE); Dieter Schreckenberger, Marbach (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 333 days.

(21) Appl. No.: 13/947,054

(22) Filed: Jul. 20, 2013

(65) Prior Publication Data
US 2013/0299398 A1 Nov. 14, 2013

Related U.S. Application Data

(63) Continuation of application No. PCT/EP2012/051168, filed on Jan. 25, 2012.

(30) Foreign Application Priority Data

Jan. 31, 2011 (DE) .......................... 10 2011 009 926

(51) Int. Cl.
*B01D 21/24* (2006.01)
*B01D 35/00* (2006.01)
(Continued)

(52) U.S. Cl.
CPC ............. *F01M 11/03* (2013.01); *B01D 27/08* (2013.01); *B01D 27/103* (2013.01);
(Continued)

(58) Field of Classification Search
None
See application file for complete search history.

(56) References Cited

U.S. PATENT DOCUMENTS 4,637,351 A * 1/1987 Pakula .......................... 123/25 J
7,682,508 B2 3/2010 Girondi
(Continued)

FOREIGN PATENT DOCUMENTS

DE 3344568 A1 6/1985

OTHER PUBLICATIONS

PCT search report dated Mar. 3, 2012.

*Primary Examiner* — Richard Gurtowski
(74) *Attorney, Agent, or Firm* — James Hasselbeck

(57) ABSTRACT

A filtering system (9) includes a filter head (12) and a replaceable filter (10). The filter head (12) has a feed line (66) and discharge line (62). The replaceable filter (10) is removable and replaceably mounted onto the filter head (12) by a rotational and/or plug connection (15) and includes a housing (17) with at least one inlet (26) for oil to be filtered and at least one outlet (28). The inlet (26) communicates with the feed line (66). The outlet (28) communicates with the discharge line (62). The housing (17) has a filtering element (34) that sealingly separates the inlet (26) from the outlet (28). The filter head (12) includes an auxiliary oil line (60). The replaceable filter (10) has a flow control element (53) that automatically closes or releases the auxiliary oil line (60) dependent on an operation and/or assembly condition.

8 Claims, 3 Drawing Sheets

(51) Int. Cl.
    *B01D 21/30*         (2006.01)
    *F01M 11/03*        (2006.01)
    *B01D 27/08*         (2006.01)
    *B01D 27/10*         (2006.01)
    *B01D 35/153*       (2006.01)
    *B01D 35/16*         (2006.01)

(52) U.S. Cl.
    CPC ......... *B01D 27/106* (2013.01); *B01D 35/153* (2013.01); *B01D 35/16* (2013.01); *B01D 2201/4084* (2013.01)

(56) References Cited

U.S. PATENT DOCUMENTS

| | | | |
|---|---|---|---|
| 8,182,681 B2* | 5/2012 | Maier | B01D 35/153 210/232 |
| 2005/0044827 A1* | 3/2005 | Eppel | B01D 46/0031 55/423 |
| 2008/0047891 A1* | 2/2008 | Roesgen | B01D 29/21 210/236 |
| 2008/0179238 A1 | 7/2008 | Foucault et al. | |
| 2009/0078629 A1 | 3/2009 | Stemmer et al. | |
| 2009/0314697 A1 | 12/2009 | Ardes | |

\* cited by examiner

FILTERING SYSTEM FOR MOTOR OIL OF AN INTERNAL COMBUSTION ENGINE AND REPLACEABLE FILTER OF A FILTERING SYSTEM

CROSS REFERENCE TO RELATED APPLICATIONS

This application is U.S. bypass continuation of international patent application no. PCT/EP2012/051168, filed Jan. 25, 2012 designating the United States of America, the entire disclosure of which is incorporated herein by reference. PCT/EP2012/051168 claims priority to German patent application no. 10 2011 009 926.3, filed Jan. 31, 2011.

TECHNICAL FIELD

The invention concerns a filtering system for motor oil of an internal combustion engine, in particular of a motor vehicle, comprising a filter head that has a feed line is for motor oil to be filtered and a discharge line for filtered motor oil and a replaceable filter that is mounted releasably by means of a rotational and/or plug connection on the filter head and that comprises a housing with at least one inlet for the motor oil to be filtered that communicates with the feed line and at least one outlet for the filtered motor oil that communicates with the discharge line and in which a filter element is arranged that separates the inlet seal-tightly from the outlet.

Moreover, the invention concerns a replaceable filter of a filtering system for motor oil of an internal combustion engine that is releasably mountable by means of a rotational and/or plug connection on a filter head and that comprises a housing with at least one inlet for motor oil to be filtered and at least one outlet for filtered motor oil and in which a filter element is arranged that separates the inlet seal-tightly from the outlet.

BACKGROUND

Filtering systems for motor oil of an internal combustion engine that are known on the market have a filter head that has a feed line for the motor oil to be filtered and a discharge line for filtered motor oil. A replaceable filter is releasably screwed onto the filter head. The replaceable filter comprises a housing with an inlet for the motor oil to be filtered and an outlet for the filtered motor oil. When the replaceable filter is mounted, the inlet communicates with the feed line in the filter head and the outlet communicates with the discharge line in the filter head. In the replaceable filter, a filter element is arranged that separates the inlet seal-tightly from the outlet and that can be flowed through by the motor oil for filtering. When the replaceable filter is mounted at a slant or vertically from above on the filter head, the residual oil contained in the filter can undesirably reach the environment, in particular the engine compartment, upon removal of the replaceable filter.

The invention has the object to design a filtering system and a replaceable filter of is the aforementioned kind in which, by means of the replaceable filter, additionally an oil distribution in the filter head can be controlled. In particular, a no-drip removal of the replaceable filter should be made possible.

SUMMARY OF THE DISCLOSURE

This object is solved according to the invention in that the filter head has an auxiliary oil line and the replaceable filter has an outflow control element that automatically closes or releases, depending on an operating and/or mounting condition, the auxiliary oil line. In particular, the outflow control element is attached in such a way on the (remaining) replaceable filter that, upon removal of the replaceable filter from the filter head, it is removed together with the replaceable filter from the filter head. Thus, in particular an outflow control element that is fast with the replaceable filter is provided.

According to the invention, an auxiliary oil line is provided that is connected preferably with the feed line or with the discharge line. By means of the outflow control element, depending on the operating condition and/or the mounting condition, an oil flow into the auxiliary oil line or out of it is controlled. For characterizing the operating condition, in particular an oil temperature and/or an oil level can be used. The mounting condition relates to the mounting state of the replaceable filter at the filter head, that is wether the filter is completely and correctly mounted at the filter head. When using a replaceable filter that is not suitable and thus does not have the required outflow control element or in case of faulty or incomplete assembly, the oil flow in the auxiliary oil line is not controlled in the required way in order to preferably prevent a disruption of the internal combustion engine. The replaceable filter can be designed in a simple way in modular configuration together with the outflow control element so that the outflow control element can be exchanged and serviced together with the replaceable filter.

In an advantageous embodiment, the auxiliary oil line can be an oil drain for draining motor oil from the feed line or the discharge line upon removal of the replaceable filter and the outflow control element can be provided with at least one closure element that closes the oil drain when the replaceable filter is mounted and automatically releases the oil drain when the replaceable filter is removed. When the replaceable filter is mounted, the closure element closes off the oil drain so that even in case of the internal combustion engine standing still the oil circuit cannot drain empty. The oil drain can be guided in particular to the oilpan which is arranged at the lowermost point of the internal combustion engine. As soon as the replaceable filter is removed from the filter head, the closure element automatically releases an appropriate opening of the oil drain. The residual oil that is contained in the filter head, in particular in the feed line or the discharge line, can thus drain via the oil drain. In this way, a no-drip removal of the replaceable filter is possible.

In an alternative advantageous embodiment, the auxiliary oil line can be connected with an auxiliary oil circuit and the outflow control element can have at least one closure element that can be controlled depending on the operating condition and controls automatically an oil flow into the auxiliary oil circuit. The auxiliary oil circuit can contain in particular an oil radiator. In this way, depending on the operating conditions an auxiliary oil circuit can be automatically switched on or off with the outflow control element. When the correct outflow control element is not present, the auxiliary oil circuit remains open so that disturbances, in particular by overheating of the motor oil, are prevented.

Advantageously, the outflow control element can have a control unit, in particular a float or a wax thermostatic element that is functionally connected with the closure element for actuation thereof. With the control unit, the operating condition can be detected and the closure element can be actuated accordingly. The outflow control element with the control unit and the closure element can be of a modular configuration and can be exchanged simply with the removal of the replaceable filter. In this way, mounting and servicing expenditure is reduced.

In a further advantageous embodiment, the outflow control element can have a shaft on which the closure element is arranged and the filter head can have a shaft receptacle in which the shaft is inserted when the replaceable filter is mounted in such a way that the closure element can close off the auxiliary oil line at least partially. The shaft can be inserted simply into the shaft receptacle when mounting the replaceable filter in order to position the closure element at an opening of the auxiliary oil line.

Advantageously, the outlet or the inlet of the replaceable filter can have a through opening that is coaxial to a rotational/plug-in axis of the rotational and/or plug connection and the shaft can be arranged coaxially to the rotational/plug-in axis. In this way, the shaft can be guided simply in the shaft receptacle upon opening or closing of the rotational and/or plug-in connection, in particular upon screwing in or unscrewing the replaceable filter. The shaft can be mounted outside of the through opening on a cover of the housing of the replaceable filter or can extend through the through opening.

Moreover, advantageously the shaft can be connected with a central tube of the replaceable filter in a monolithic or two-part configuration, in particular by means of a snap connection. The shaft can be advantageously embodied monolithically with the central tube and can be passed through the through opening in the cover of the housing of the replaceable filter. A monolithic component can be produced in a simple and inexpensive way and is stable. A separate attachment of the shaft is not required. Alternatively, the shaft and the central tube can be of a two-part configuration. In particular, the shaft can be attached by means of a snap or clip connection on the central tube. In this way, the shaft can be separated from the replaceable filter housing and upon exchange of the replaceable filter can be re-used. This is in particular advantageous when the shaft is equipped with a complex outflow control element, in particular a temperature sensor or a float.

Moreover, advantageously the shaft can be a tube whose wall has a plurality of openings. In this way, motor oil can flow into the interior of the shaft and can flow out of it. The interior of the shaft can be connected in particular with the interior of the filter element. In this way, the shaft receptacle together with the shaft can act as a part of the feed line or the discharge line in the filter head.

In a further advantageous embodiment, the replaceable filter can be mounted spatially from above on the filter head. The replaceable filter can thus be mounted from above on the internal combustion engine in a space-saving way and so as to be simply accessible from the exterior. With the outflow control according to the invention, it is prevented in a simple way that residual oil can escape from the filter head upon removal of the replaceable filter.

The object is solved furthermore according to the invention in that the replaceable filter has an outflow control element that, when the replaceable filter is mounted, can automatically close or release an auxiliary oil line of the filter head depending on the operating and/or mounting conditions. The advantages and features that have been mentioned above in connection with the filtering system according to the invention apply likewise to the replaceable filter according to the invention.

BRIEF DESCRIPTION OF THE DRAWINGS

Further advantages, features and details of the invention result from the following description in which an embodiment of the invention will be explained in more detail with the aid of the drawing. A person of skill in the art will expediently consider the features disclosed in combination in the drawing, the description and the claims also individually and combine them to meaningful further combinations.

It is shown in.

DETAILED DESCRIPTION

Figure 1:
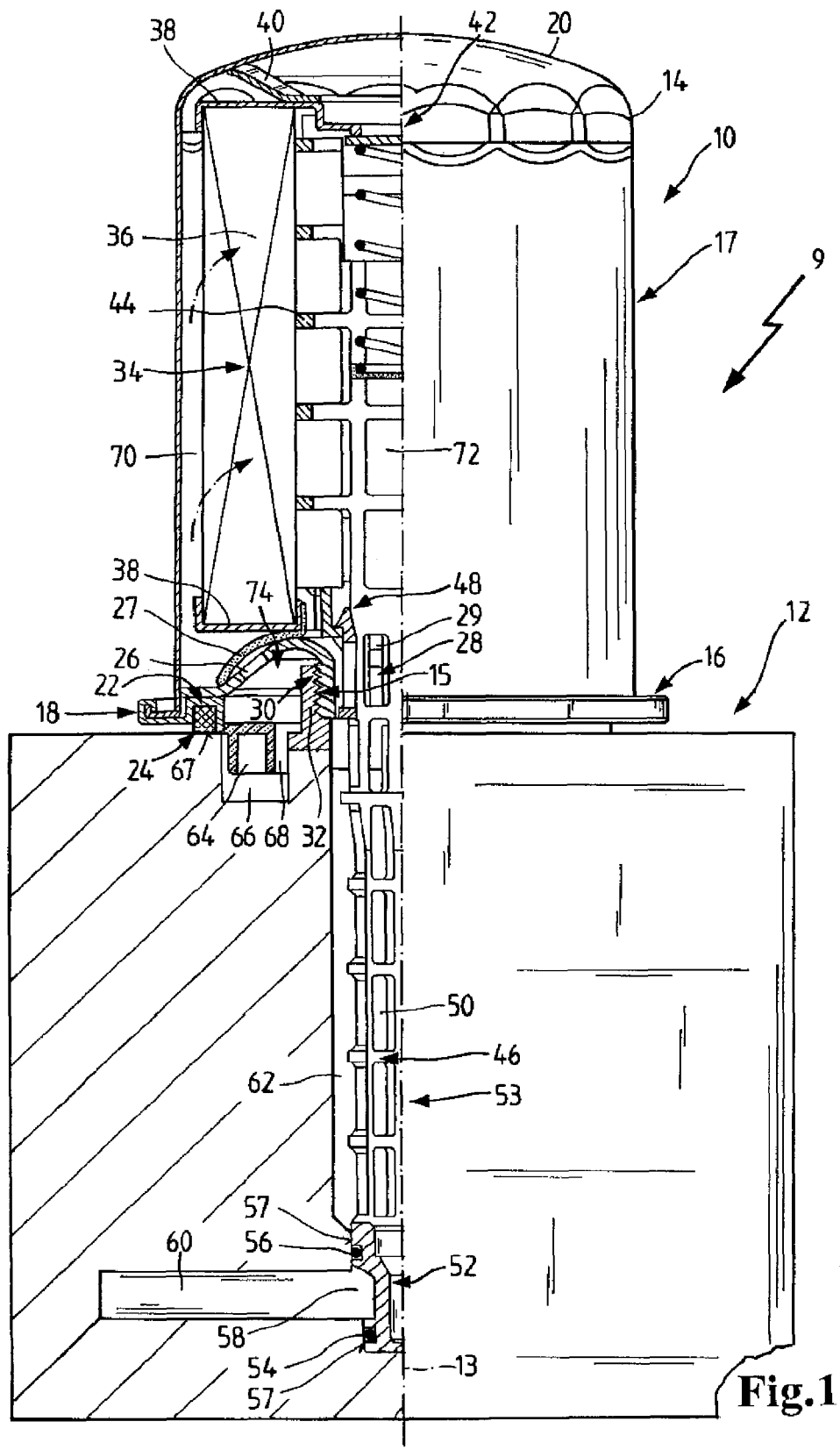
FIG. 1 schematically, one half in section, a filter system of an internal combustion engine with an exchangeable replaceable filter that has an outflow control element for an oil drain at a filter head.
Figure 2:
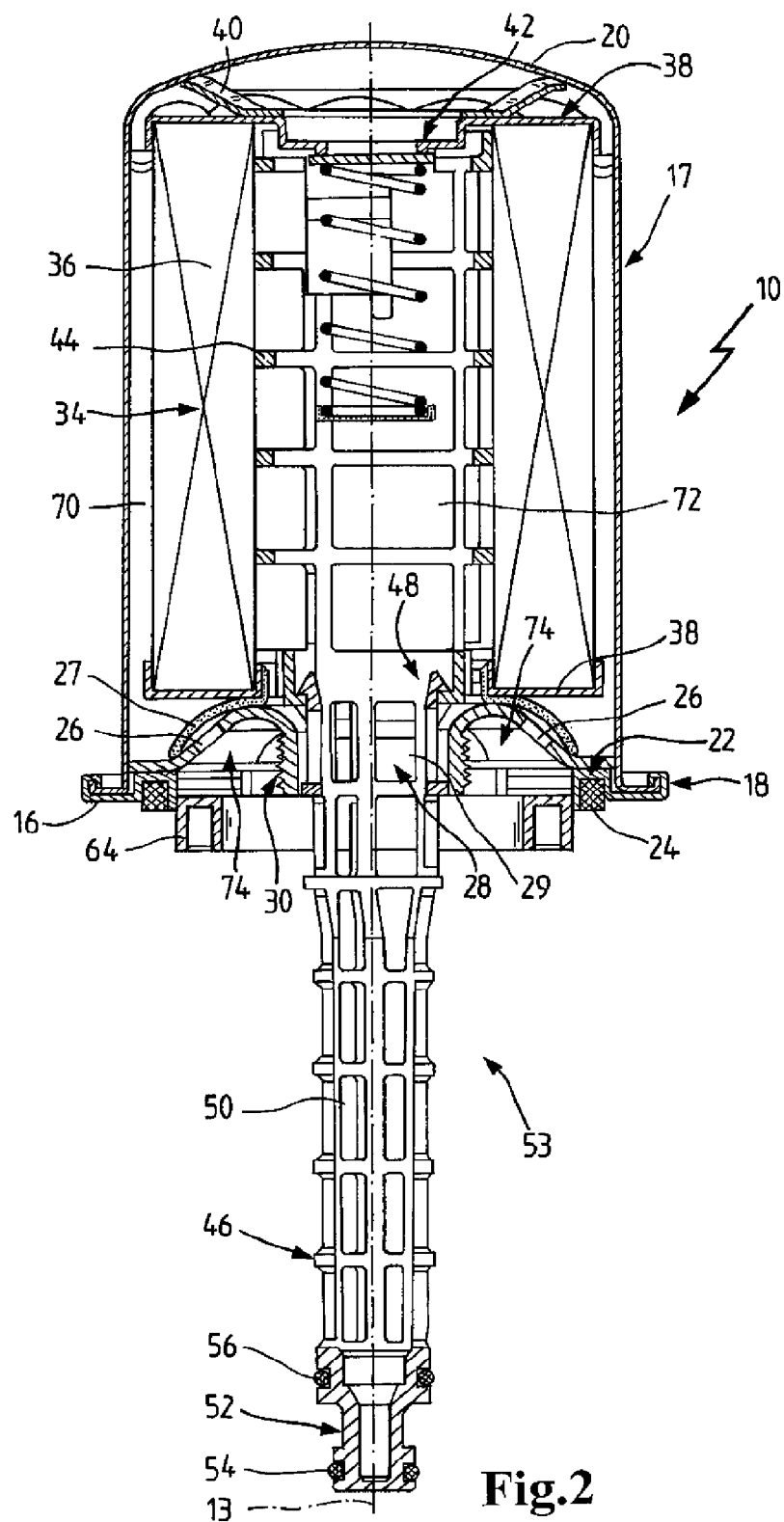
FIG. 2 schematically a longitudinal section of the replaceable filter of the FIG. 1.
Figure 3:
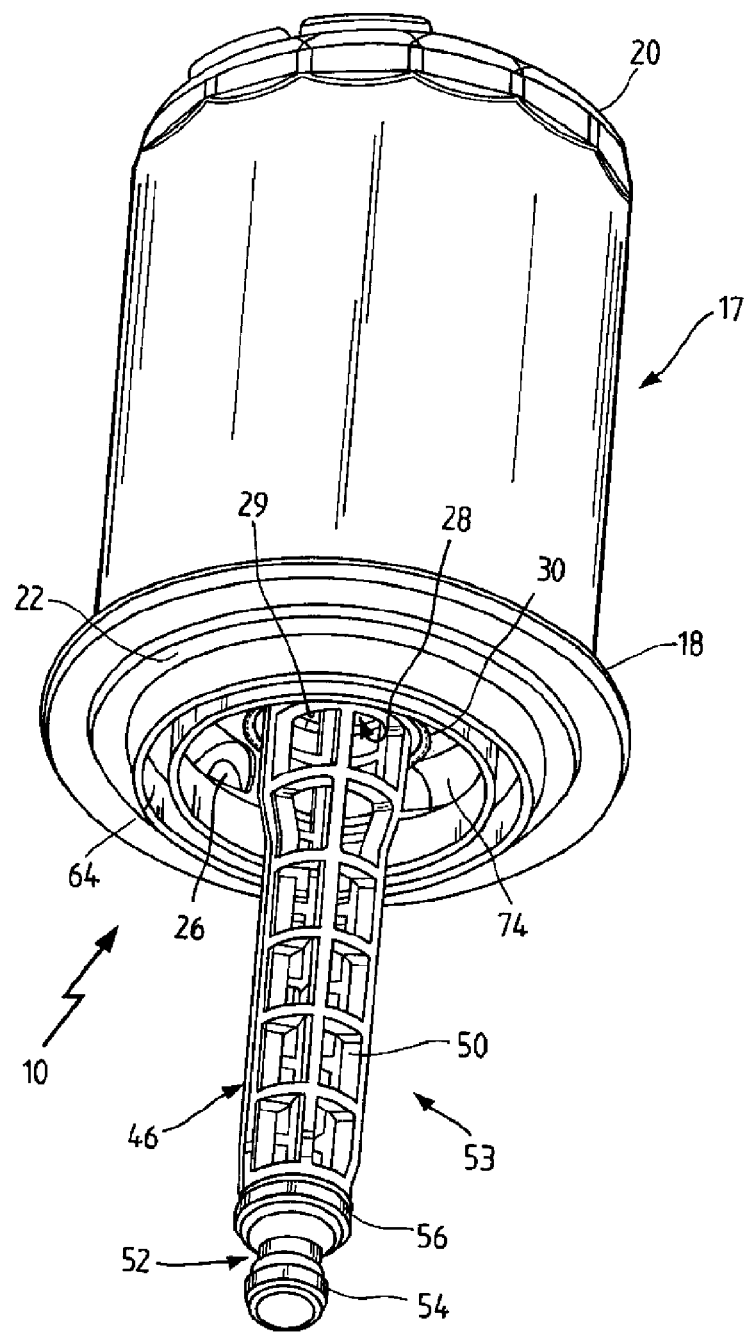
FIG. 3 an isometric illustration of the replaceable filter of FIGS. 1 and 2.

In FIG. 1, a section of a filtering system 9 for motor oil of an internal combustion engine, not shown otherwise, is illustrated, showing one half in longitudinal section. A replaceable filter 10 is screwed from above onto a filter head 12 of the filtering system 9. The replaceable filter 10 as a whole is symmetrical to a symmetry axis 13 which forms also a rotational/plug-in axis for a screw connection 15 of the replaceable filter 10 with the filter head 12.

The replaceable filter 10 comprises a cup 14 and a cover 16. The cup 14 forms together with the cover 16 a housing 17 which substantially represents the outer geometry of the replaceable filter 10. The cup 14 is connected by means of a fluid-tight crimp connection 18 with the cover 16. The cup 14 comprises a closed cylindrical circumferential area which passes in the lower area of the cup 14 into a cup bottom 20. In the area of the crimp connection 18, a sealing groove 22 is arranged in which a seal 24 is positioned.

In the cover 16, several inlet openings 26 are provided in distribution and through which the motor oil to be purified flows into the replaceable filter 10. The inlet openings 26 are covered on the side that is facing the interior of the cup 14 with a no-return membrane 27. Moreover, the cover 16 has a centrally arranged tubular socket-shaped outlet 28 with an outlet opening 29 that is coaxial to the symmetry axis 13. The outlet 28 has at its radial outer peripheral side an outer thread 30 for screw-connecting the replaceable filter 10 to a socket 32 provided with an appropriate inner thread. The outer thread 30 and the inner thread are part of the screw connection 15. The socket 32 is part of the filter head 12.

In the interior of the housing 17 a filter element 34 is arranged such that the inlet openings 26 are seal-tightly separated from the outlet 28. The filter element 34 comprises for this purpose a filter medium 36 which is folded in a zigzag shape and is closed to a star shape. Terminal disks 38 are arranged at the end face ends of the filter medium 36.

The terminal disk 38 that is facing the cup bottom 20 is supported by support elements 40 on the cup bottom 20.

In an opening that is provided in the terminal disk 38 facing the cup bottom 20 and that is coaxial to the symmetry axis 13, a bypass valve 42, not of interest in this context, is arranged which projects into the interior of the filter element 34.

In the interior of the filter element 34 there is a skeleton-like central tube 44 onto which the filter element 34 is pushed. The central tube 44 is coaxial to the symmetry axis 13 and extends between the two terminal disks 38.

A tubular shaft 46 that is coaxial to the symmetry axis 13 is extending through the outlet opening 29. The shaft 46 is connected at one end approximately at the level of the upper terminal disk 38 by a clip connection 48 to the central tube 44. A peripheral wall of the shaft 46 has a plurality of openings 50 through which the motor oil can flow out of the interior of the shaft 46. At the free end of the shaft 46 a cup-shaped closure element 52 is formed whose open side faces the cover 16 of the replaceable filter 10. The peripheral wall of the closure element 52 has several steps. The greatest diameter of the closure element 52 is located at the open side. The shaft 46 and the closure element 52 form an outflow control element 53 of the replaceable filter 10.

In the vicinity of the end faces of the closure element 52, respectively, there is provided in the radial outer peripheral side a circumferential groove with a respective annular seal 54 and 56. With screwed-in replaceable filter 10, the annular seals 54 and 56 close seal-tightly relative to appropriate sealing surfaces 57 a connecting opening 58 between an oil drain 60 and a shaft receptacle 62 of the filter head 12.

The shaft receptacle 62 is part of a discharge line for filtered motor oil, not shown in detail. The shaft receptacle 62 is substantially coaxial to the symmetry axis 13. When the replaceable filter 10 is mounted, the shaft 46 of the replaceable filter 10 is inserted into the shaft receptacle 62 in such a way that the connecting opening 58 to the oil drain 60 is closed by means of the closure element 52.

The oil drain 60 extends in a way not of interest in this connection into an oilpan that is not shown in FIG. 1.

On the cover 16 of the replaceable filter 10 radially within the seal 24 an annular projection 64 is arranged that is coaxial relative to the symmetry axis 13 and has a U-shaped profile. The open side of the U-shaped profile is pointing away from the cup bottom 20 in axial direction. When the replaceable filter 10 is mounted, the annular projection 64 engages an appropriate annular feed groove 66 in the filter head 12. The feed groove 66 is located also radially within the seal 24. The seal 24 is supported on an appropriate sealing surface 67 of the filter head 12 that outwardly surrounds the feed groove 66 in radial direction. The feed groove 66 is part of a feed line for motor oil to be filtered in the filter head 12, the feed line not further described in the following.

Between the radial inner sidewall of the feed groove 66 and the radial inner exterior wall of the annular projection 64, there is a gap 68 through which the motor oil to be filtered flows from the feed groove 66 into the inflow chamber 74 in the cover 16 and from there can flow into the inlet openings 26.

Upon operation of the internal combustion engine, the motor oil to be filtered flows from the motor oil circuit into the feed groove 66 of the feed line of the filter head 12. From there, the motor oil flows through the gap 68 into the inflow chamber 74. is The motor oil flows through the inlet openings 26 into the housing 17 to a radial outer raw side 70 of the filter element 34.

The motor oil to be filtered flows for filtration through the filter medium 36 radially from the exterior to the interior to a clean side 72. The filtered motor oil passes through the opening of the skeleton-like central tube 44 into the interior of the filter element 34. It flows towards the interior of the shaft 46 and exits the replaceable filter 10 through the outlet 28. Through the openings 50 of the shaft 46 the filtered motor oil reaches the shaft receptacle 62 and thus the discharge line. Via the discharge line, the filtered motor oil returns into the motor oil circuit.

For removal, the replaceable filter 10 is unscrewed axially relative to the symmetry axis 13 from the filter head 12. When doing so, the shaft 46 is pulled out from the shaft receptacle 62 axially relative to the symmetry axis 13 and the closure element 52 is pulled off the corresponding sealing surfaces 57 of the connecting opening 58 of the oil drain 60. The closure element 52 thus automatically releases the connecting opening 58 to the oil drain 60. Residual oil which is contained in the discharge line can thus drain via the oil drain 60 into the oilpan.

Simultaneous with unscrewing of the replaceable filter 10, the annular projection 64 is moved out of the feed groove 66. The residual oil contained in the inflow chamber 74 and still to be filtered is collected in the feed groove 66.

As a whole, residual oil possibly still contained in the inflow chamber 74, in the feed groove 66 and in the discharge line 62 will not reach the environment upon unscrewing the replaceable filter 10 so that a no-drip removal can be realized.

For mounting, the shaft 46 of the replaceable filter 10 is inserted so far into the shaft receptacle 62 that the outer thread 30 of the outlet 28 is contacting the inner thread of the socket 32. Subsequently, the replaceable filter 10 is screwed on. When doing so, the closure element 52 automatically closes the connecting opening 58 between the shaft receptacle 62 and the oil drain 60. In the final mounted state, the seal 24 rests seal-tightly on the sealing surface 67 of the filter head 12.

In all of the described embodiments of a filtering system 9 and of a replaceable filter 10 the following modifications are possible inter alia.

The replaceable filter 10 can also be designed such that the clean side is located in radial direction outside of the filter medium 36 and the raw side is arranged within the filter medium so that the motor oil to be filtered flows in radial direction from the interior to the exterior. In this case, the shaft receptacle 62 is part of the feed line and a discharge groove corresponding to the feed groove 66 is part of the discharge line. The oil drain 60 is connected by means of connecting opening 58 with the feed line. The residual oil in the inflow chamber 74 is caught in the feed groove 66 upon removal of the replaceable filter 10. The no-return membranes in this case are to be replaced by suitable no-return devices of a different kind.

The closure element 52 can also perform further control functions. For example, the closure element can be provided with a control unit, for example, a float or a wax thermostatic element with which the closure of the connecting opening 58 can be controlled, depending on operating conditions, for example, a motor oil temperature and/or motor oil level in the drain line.

In addition to the closure element 52 in or on the shaft 46, a further control unit with a closure element for automatically closing or releasing a further auxiliary oil line, for example, of a separate oil radiator circuit, can be provided.

The replaceable filter 10, instead of being mounted from above on the filter head 12, can also be mounted thereon at a slant from above.

It is also possible to provide a different kind of filter element 34 which is provided with a differently shaped filter medium in place of the zigzag-shaped folded filter medium 36.

Instead of being connected by means of the screw connection 15, the replaceable filter 10 can also be detachably connected on the filter head 12 by means of a different kind of rotational and/or plug-in connection, for example, a bayonet-like connection.

Instead of being of a two-part configuration connected by a clip connection 48, the shaft 46 can also be monolithically connected with the central tube 44.

Instead of being coaxial, the shaft 46 can also be eccentrically arranged relative to the symmetry axis 13 and with one end, for example, by means of a universal joint-like connection, can be attached preferably on the housing 17 of the replaceable filter 10.

The invention claimed is:

1. A filtering system for motor oil of an internal combustion engine, comprising:
a filter head, including:
a feed line receiving motor oil to be filtered;
a discharge line discharging filtered motor oil;
a rotational head or plug connection on the filter head; and
an auxiliary oil line;
a replaceable filter removeably connected and mounted on the filter head;
wherein the replaceable filter is releaseably connected to the filter head by the rotational or plug connection;
wherein the replaceable filter includes:
a filter housing, the filter housing including:
at least one inlet receiving motor oil to be filtered and in fluid flow communication with the feed line;
wherein the filter housing has an annular rotational or plug connection member, the annular rotational or plug connection member of the filter housing engaging onto the rotational or plug connection of the filter head, mounting the replaceable filter to the filter head;
wherein the annular rotational or plug connection member of the filter housing has an outlet opening extending therethrough, the outlet opening discharging filtered motor oil from an interior of the replaceable filter, the outlet opening in fluid flow communication with the discharge line; and
a filter element of an annular circumferentially closed filter medium circumferentially surrounding a hollow interior, the filter medium having two opposing axial end faces, the filter element arranged within an interior of the filter housing, the filter element seal-tightly separating the inlet from the outlet opening, the filter element including:
a terminal disk arranged on one of the axial end faces of the filter medium, the terminal disk having a central opening extending through the terminal disk, opening into the hollow interior;
a central tube arranged within the hollow interior at a radially inner side of the filter medium, the central tube extending between the two opposing axial end faces of the filter medium;
a tubular shaft extending from an interior of the central tube radially interior to the filter medium, through the central opening of the terminal disk and through the outlet opening of the filter housing to an exterior of the filter housing, the tubular shaft having:
a first end extending through the central opening of the terminal disk, the first end positioned within a radial interior of the central tube, within the hollow interior of the filter medium, the first end directly connected onto the central tube of the filter element;
an opposing second end spaced outwardly away from the filter housing;
at least one closure element arranged at and secured onto the second end of the tubular shaft;
wherein the tubular shaft is fixedly connected directly onto the central tube within the hollow interior by a clip-on connection, the clip-on connection formed on the tubular shaft at the first end by radially outwardly acting clips, the radially outwardly acting clips arranged in the interior of the central tube and directly engaging the central tube;
wherein the tubular shaft and at least one closure element of the replaceable filter form an automatically operating outflow control element that automatically closes or releases the auxiliary oil line depending on an operating or mounting condition;
wherein the filter head further includes a shaft receptacle into which, when the replaceable filter is mounted, the tubular shaft is inserted in such a way that the at least one closure element at least partially closes off the auxiliary oil line.

2. The filtering system according to claim 1, wherein
the auxiliary oil line includes an oil drain operable for draining motor oil from the feed line or the discharge line upon removal of the replaceable filter; and
at least one closure element closes off the oil drain when the replaceable filter is mounted to the filter head and that automatically releases the oil drain when the replaceable filter is removed from the filter head.

3. The filtering system according to claim 1, wherein
the auxiliary oil line is fluidically connected with an auxiliary oil circuit; and
the at least one closure element automatically controls an oil flow into the auxiliary oil circuit;
wherein the at least one closure element is automatically controlled by any of: oil level and oil temperature.

4. The filtering system according to claim 3, wherein
the outflow control element includes a control unit having a float detecting oil level or a wax thermostatic element responsive to oil temperature;
wherein the control unit is connected functionally with the at least one closure element and actuates the at least one closure element.

5. The filtering system according to claim 1, wherein
the outlet opening is coaxial to a rotational/plug-in axis of the rotational or plug connection; and
wherein the tubular shaft is arranged coaxially to the rotational/plug-in axis.

6. The filtering system according to claim 1, wherein
the tubular shaft has an open interior whose outer wall has a plurality of openings extending into the interior of the tubular shaft.

7. The filtering system according to claim 1, wherein
the replaceable filter is replaceably mounted onto the filter head from above the filter head.

8. A replaceable filter of a filtering system that is releaseably mountable by means of a rotational and/or plug connection on a filter head, the replaceable filter comprising:
a filter housing, the filter housing including:
at least one inlet receiving motor oil to be filtered;
wherein then filter housing has an annular rotational or plug connection member, the annular rotational or plug connection member of the filter housing configured to engage with a rotational or plug connection of the filter head, to mount the replaceable filter to the filter head;
wherein the annular rotational or plug connection member of the filter housing has an outlet opening extending therethrough, the outlet opening discharging filtered motor oil from an interior of the replaceable filter;

a filter element of an annular circumferentially closed filter medium circumferentially surrounding a hollow interior, the filter medium having two opposing axial end faces, the filter element arranged within an interior of the filter housing, the filter element sealtightly separating the inlet from the outlet opening, the filter element including:
  a terminal disk arranged on one of the axial end faces of the filter medium, the terminal disk having a central opening extending through the terminal disk, opening into the hollow interior;
  a central tube arranged within the hollow interior at a radially inner side of the filter medium, the central tube extending between the two opposing axial end faces of the filter medium;
  a tubular shaft extending from an interior of the central tube radially interior to the filter medium, through the central opening of the terminal disk and through the outlet opening of the filter housing to an exterior of the filter housing, the tubular shaft having:
    a first end extending through the central opening of the terminal disk, the first end positioned within a radial interior of the central tube, within the hollow interior of the filter medium, the first end directly connected onto the central tube of the filter element
  an opposing second end spaced outwardly away from the filter housing;
  a closure element arranged at and secured onto the second end of the tubular shaft;
  wherein the tubular shaft is fixedly connected directly onto the central tube within the hollow interior by a clip-on connection, the clip-on connection formed on the tubular shaft at the first end by radially outwardly acting clips, the radially outwardly acting clips arranged in the interior of the central tube and directly engaging the central tube;
    wherein the tubular shaft and closure element of the replaceable filter form an automatically operating outflow control element that when the replaceable filter is mounted on the filter head, can automatically release or close an auxiliary oil line of the filter head depending on the operating and/or mounting conditions.

* * * * *